United States Patent [19]

Dewhirst

[11] Patent Number: 4,730,995
[45] Date of Patent: Mar. 15, 1988

[54] SCREW COMPRESSOR BEARING ARRANGEMENT WITH POSITIVE STOP TO ACCOMMODATE THRUST REVERSAL

[75] Inventor: Randy E. Dewhirst, Onalaska, Wis.

[73] Assignee: American Standard Inc., New York, N.Y.

[21] Appl. No.: 911,539

[22] Filed: Sep. 25, 1986

[51] Int. Cl.$^4$ ............................................. F04C 18/16
[52] U.S. Cl. ....................................... 418/1; 418/203; 384/517; 384/563; 384/626
[58] Field of Search .................... 418/203, 1; 384/517, 384/535, 563, 581, 626

[56] References Cited

U.S. PATENT DOCUMENTS

| 3,726,576 | 4/1973 | Barnbrook | 384/563 |
| 3,730,600 | 5/1973 | Degnan | 384/626 |
| 3,932,073 | 1/1976 | Schibbye | 418/203 |
| 4,142,765 | 3/1979 | Olsaker | 308/207 |
| 4,185,949 | 1/1980 | Lundberg | 418/203 |
| 4,227,755 | 10/1980 | Lundberg | 308/184 |
| 4,465,446 | 8/1984 | Nemit, Jr. | 418/201 |
| 4,531,847 | 7/1985 | F'Geppert | 384/626 |

FOREIGN PATENT DOCUMENTS

| 2162249 | 1/1986 | United Kingdom | 418/203 |
| 2169361 | 7/1986 | United Kingdom | |

*Primary Examiner*—Carlton R. Croyle
*Assistant Examiner*—Jane E. Obee
*Attorney, Agent, or Firm*—William J. Beres; David L. Polsley; Robert J. Harter

[57] ABSTRACT

A first shim mounted on the shaft extending from the high pressure end face of a screw rotor in a screw compressor establishes the operating clearance between the high pressure end face of the rotor and the high pressure end wall of the compressor's working chamber by fixing the axial position of a bearing group which is likewise mounted on the rotor shaft. A second shim, disposed between the bearing group and a spring biased spacer element, is determinative of the distance the spacer element, and therefore the rotor, can travel in a direction toward the high pressure end of the compressor under the impetus of reverse axial thrust. Contact of the rotor with the high pressure end wall of the working chamber is positively precluded because movement of the spacer element, under the influence of rotor movement toward the high pressure end of the compressor, collapses the biasing spring which causes the spacer element to contact a fixed surface of the compressor. The spacer element contacts the fixed compressor surface and the reverse axial thrust is taken up by a roller bearing before the rotor can migrate sufficiently within the working chamber to contact the end wall of the working chamber. The biasing spring is selected to have sufficient strength to both preload the bearing set and to provide a limited amount of resistance, of itself, to reverse axial thrust while not being so strong as to cause significant frictional losses in the compressor or degradation of bearing life.

19 Claims, 1 Drawing Figure

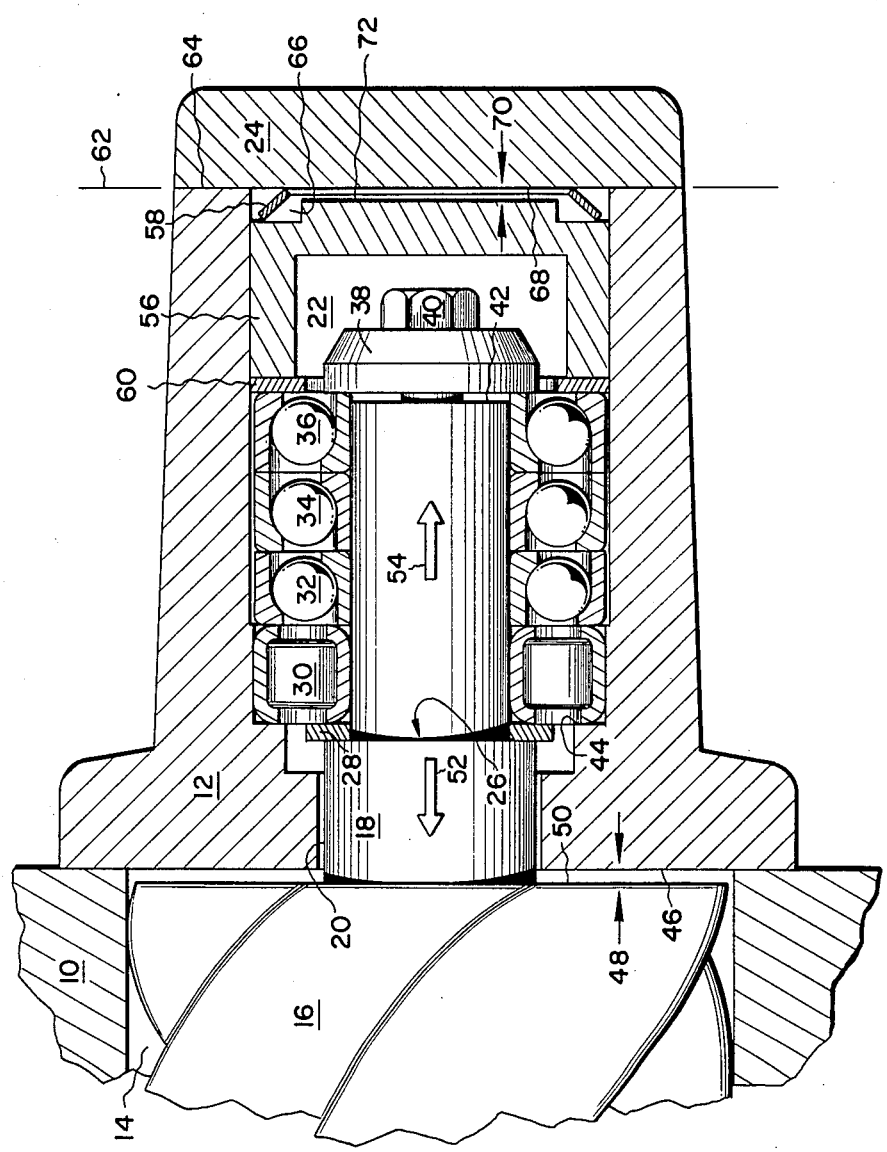

4,730,995

SCREW COMPRESSOR BEARING ARRANGEMENT WITH POSITIVE STOP TO ACCOMMODATE THRUST REVERSAL

FIELD OF THE INVENTION

The present invention relates generally to a bearing arrangement for mounting the rotors of a screw rotor set in a screw compressor. More particularly, the present invention relates to a screw compressor rotor bearing arrangement in which the bearings are preloaded and which positively insures that the high pressure end faces of the rotor set are precluded from contacting the high pressure end wall of the working chamber of the compressor under any circumstances.

BACKGROUND OF THE INVENTION

A screw compressor is one in which male and female screw rotors are disposed in a working chamber which is closely toleranced to the outside dimensions of the meshed pair of rotors. A suction port is formed at one end of the working chamber and a discharge port at the other. The suction and discharge ports of a screw compressor are essentially valveless openings which communicate with the working chamber of the compressor at its low pressure and high pressure ends respectively. The male and female rotors each have a high pressure end face which is parallel and closely proximate to the high pressure end wall of the working chamber.

In operation, low pressure gas enters the suction port and fills a chevron shaped chamber which is defined between the male and female rotors and by the walls of the working chamber. As the rotors rotate and mesh, the volume of the chevron shaped chamber decreases and the chamber is both axially and circumferentially displaced toward the high pressure end of the compressor. The reduction in the size of the chamber causes the compression of the low pressure gas which is initially trapped in the chamber when the rotation of the rotors closes it off from the suction port. The volume of the chamber decreases and the compression process continues until the chamber is circumferentially displaced to the extent that it comes into communication with the discharge port at the high pressure end of the compressor working chamber.

The chevron shaped chamber formed between the male and female rotors is partially defined, as noted earlier, by the interior walls of the compressor working chamber, including the high pressure end wall thereof. Therefore, the pressure in the chevron shaped chamber acts on the fixed high pressure end wall of the working chamber and increasingly so as the volume of the chevron shaped chamber decreases and the pressure interior of it increases. The effect of the buildup of such pressure is to impose an axial force on the rotor set which biases the rotors away from the high pressure end wall of the working chamber. This is the normal situation which exists during screw compressor operation and such axial thrust on the rotor set toward the suction end of the compressor is accounted for in every screw compressor arrangement. However, while axial thrust on the rotor set toward the low pressure end wall of the working chamber is the norm, axial thrust on the rotor set toward the high pressure end wall is not.

The development of reverse axial thrust on the rotor set of a screw compressor has generally been observed to occur during periods of transient compressor loading, such as during the unloading or shutdown of the compressor. Several untoward results can occur if such reverse axial thrust is allowed to develop on the rotor set and is unaccounted for. The most significant possibility is the contact of the end faces of the rotating screw rotor set with the high pressure end wall of the compressor working chamber during the absence of sufficient lubricant between the surfaces. Such contact can, of course, result in the catastrophic failure of the compressor.

Historically, two primary schools of thought have existed with respect to addressing the problem of reverse axial thrust in a screw compressor. U.S. Pat. No. 4,142,765 to Olsaker teaches that because of reverse thrust considerations in screw compressors, the high pressure end faces of the screw rotors, as well as the high pressure end wall of the working chamber must be fabricated from a surface material such that a material combination is provided which has bearing characteristics. In U.S. Pat. No. 4,185,949, Lundberg merely acknowledges that when the rotors are unloaded in a screw compressor they will tend to be drawn toward the high pressure end wall of the working chamber. Lundberg states that it is assumed that such movement of the rotor set is hindered by the abutting of the high pressure end surfaces of the rotors with the high pressure end wall of the working chamber of the compressor. Once again, it is at least implied that the material selection for and fabrication of the screw rotor set and the rotor housing must be carefully considered in respect of the contemplated contact or abutment of the high pressure end faces of the rotor set with the high pressure end wall of the working chamber of the compressor.

More recently, possibly in recognition of the fact that even a minor and short-lived lubrication failure can cause a catastrophic failure of the compressor where rotor end face to working chamber end wall abutment is an inherent possibility due to a particular screw compressor design, positive steps have been taken in screw compressor bearing arrangements to bias the rotor set in a direction away from the high pressure end wall of the working chamber. Such arrangements generally include the use of a spring or hydraulic pressure to act upon the bearing sets in which the screw rotor shafts are captured at the high pressure end of the compressor in a direction which urges the rotors away from the high pressure end wall of the compressor working chamber.

Exemplary in this regard are U.S. Pat. Nos. 4,227,755 to a second individual named Lundberg and 4,465,446 to Nemit, Jr. et al. In Lundberg '755, yielding means, exemplified both by various springs and a pressure fluid acting on an axially moveable element, act on the bearing sets in which the shafts of the rotors of a screw compressor are captured so as to force the rotor set in a direction toward the low pressure end of the compressor. The various arrangements taught in the '755 patent are such that sufficient force is exerted by the yielding means, under all circumstances, to prevent any axial movement of the rotor set in a direction toward the high pressure end of the compressor. That is, the anti-friction bearing of the bearing arrangements taught by the latter Lundberg is at all times kept pressed, by the yielding means disclosed therein, against a fixed surface of the rotor housing.

Nemit, Jr. et al., like the latter Lundberg, teaches the exertion of force upon the bearings of a rotor set which is in a direction toward the low pressure end of the compressor. The force is exerted by a spring which is said to have a load rating sufficient under all circumstances to prevent the further compression of the spring beyond the compression which is occasioned by the compressor assembly process. It is stated that by virtue of this arrangement the clearance established between the high pressure end faces of the rotor set and the high pressure end wall of the working chamber of the compressor is at all times retained as it is established at the time of compressor manufacture.

A disadvantage of the use of biasing springs or the like which have the inherent strength to prevent any movement of the rotor set toward the high pressure end of the compressor is the degree of the frictional forces they impart and which must be overcome as a result of their employment. Such forces are present and must be overcome irrespective of load or thrust conditions whenever the compressor is in operation. As a result of having to continuously carry the increased bearing loads imparted by such arrangements and of having to overcome the friction created by such biasing schemes, bearing life is shortened and compressor energy consumption is increased.

SUMMARY OF THE PRESENT INVENTION

It is the primary object of the present invention to insure that contact between the high pressure end faces of a screw compressor rotor set and the high pressure end wall of the compressor working chamber is positively precluded under all circumstances.

It is a further object of the present invention to positively preclude the contact of the rotor set of a screw compressor with the high pressure end wall of the working chamber of the compressor while minimizing the frictional forces that must be overcome, during the course of normal compressor operation, which result from the employment of the contact precluding arrangement.

It is an additional object of the present invention to preload the bearing set at the high pressure end of a screw compressor so as to prevent ball skidding during low compressor load conditions.

Finally, it is an object of the present invention to both mechanically preload the bearing sets of the rotors of a screw compressor and to mechanically bias the rotor set toward the low pressure end of the compressor wherein the means by which such mechanical biasing and preloading is achieved yields completely to a mechanical stop when the magnitude of reverse axial thrust on the rotors exceeds a predetermined level.

The objects of the present invention, as stated above, and other objects which will become apparent when the specification, claims and drawing herein are considered, are accomplished by a bearing arrangement which employs a spring to bias the rotor set of a screw compressor toward the low pressure end of the compressor and a shim arrangement integral with the bearing arrangement which positively prevents the contact of the rotor set with the high pressure end wall of the working chamber of the compressor.

The shafts of the rotors of a screw rotor set are each mounted in a bearing set at the high pressure ends of the rotors. Each bearing set includes angular contact ball bearings that accomodate thrust on the rotor set which is in a direction toward the low pressure end of the compressor. The radial load on the rotors is taken up by roller bearings which are also disposed on the rotor shafts. A reverse angular contact ball bearing, in cooperation with a spring, accomodates thrust on the rotor which is in a direction away from the low pressure end of the compressor, i.e., which is in a direction which urges the high pressure end faces of the rotor toward the high pressure end wall of the working chamber of the compressor.

The bearing set is preloaded by the spring and the rotor is mechanically biased, operating thrust forces aside, away from the high pressure end of the working chamber of the compressor at all times. While the spring is selected to be of sufficient strength so as to preload the bearings and additionally to counteract, to a predetermined limited degree, the reverse axial thrust which can develop on the rotor set during transient compressor load conditions, it is not so strong as to impart a degree of countering axial thrust which is detrimental from the standpoint of bearing life and continuing frictional losses imposed by it during normal compressor operation.

A first shim mounted on the rotor shaft establishes the operating clearance between the high pressure end face of a screw rotor and the high pressure end wall of the working chamber of the compressor by establishing, during the compressor assembly process, the position of the bearings on the rotor shaft. A second shim disposed between the shaft mounted bearings and a spacer element on which the biasing spring acts is determinative of the width of a gap between the spacer element and a fixed compressor surface. The side of the spring which does not act on the spacer element abuts a fixed surface of the compressor. By selecting the operating clearance established by the first shim to always be greater than the distance the spacer element can travel toward the rotor housing under the impetus of rotor migration in the working chamber, contact of the screw rotors with the high pressure end wall of the working chamber of the compressor is positively precluded.

If reverse axial thrust develops on the rotor set to the extent that the preselected limited biasing force created by the preload spring is overcome and the rotors start to migrate toward the high pressure end of the working chamber, the preload spring will collapse and the spacer element will move into direct contact with the rotor housing. The contact of the spacer element with the rotor housing positively prevents further movement of the rotor set toward the high pressure end of the compressor and therefore any contact of the screw rotors with the rotor housing due to the physical inability, after such contact has occurred, of the rotor set to move further in a direction toward the high pressure end of the compressor. At such time as reverse thrust decreases to the extent that the force of the spring can overcome it, the spacer element will be biased by the spring to move the rotor set back toward the low pressure end of the compressor to reestablish the normal operating clearance between the rotors and the high pressure end wall of the working chamber.

BRIEF DESCRIPTION OF THE DRAWING

The single drawing figure illustrates the bearing and rotor mounting arrangement of the present invention as when the compressor is operating normally with the screw rotor being biased away from the high pressure end wall of the working chamber.

DESCRIPTION OF THE PREFERRED EMBODIMENT

Referring to the drawing figure, it will be seen that rotor housing 10 and bearing housing 12 cooperate to define the working chamber 14 of a screw compressor. Disposed within working chamber 14 is a screw rotor 16 having a shaft 18 which extends through shaft opening 20 into bearing chamber 22 of the bearing housing. Bearing chamber 22 is defined by bearing housing 12 and bearing housing end plate 24. Although only one screw rotor is illustrated in the drawing, it will be appreciated that both a male and a female screw rotor are disposed in the working chamber of a screw compressor and that the present invention is applicable to both the male and female rotors. The rotor illustrated in the drawing figures is the one of the male and female rotors in a screw compressor working chamber which is driven to cause the meshing rotation of the rotor set and the compression of a gas therebetween.

Shaft 18 of rotor 16 includes a collar portion 26 where the diameter of the rotor shaft decreases. During the assembly of the screw compressor, a shaft shim 28 is assembled onto shaft 18 and is brought into abutment with collar portion 26 of the rotor shaft. Next, in the preferred embodiment, a radial load bearing 30 is pressed onto the rotor shaft. Finally, first, second and third roller bearings 32, 34 and 36 are pressed onto the shaft and are oriented as illustrated. In the preferred embodiment, roller bearings 32 and 34 take up axial thrust which tends to force the screw rotor 16 away from the high pressure end wall of the working chamber. Such thrust is developed during normal compressor operation. Roller bearing 36, however, is oriented to take up thrust which tends to drive rotor 16 toward the high pressure end wall of the working chamber and to cooperate in the preloading of bearings 32 and 34 so as to minimize ball skidding during low compressor load periods as will be described below. The bearings, 30, 32, 34 and 36 comprise the bearing group which is found on the shaft extending from the high pressure end face of screw rotor 16.

A shaft end cap 38 is tightened onto the end of shaft 18 as by the use of an end bolt 40 which threads axially into the end of the rotor shaft. It will be noted that end cap 38 abuts the inner race of roller bearing 36 and does not abut end face 42 of the rotor shaft 18. Therefore, as end bolt 40 is tightened into the accomodating threaded hole in shaft 18, an equal degree of movement of end cap 38 occurs which in turn forces roller bearing 36 toward shaft collar 26. The forced movement of roller bearing 36 continues to progress, as bolt 40 is tightened, until the inner races of the radial load bearing 30 and roller bearings 32, 34 and 36 are pressed tightly together with the inner race of radial load bearing 30 being forced into abutment with shaft shim 28. It will be appreciated from the above description that the thickness of shaft shim 28 is determinative of the position of the bearing group on rotor shaft 18 in the first instance. That is, the thicker shaft shim 28 is, the further will be the bearing group from shaft collar 26.

As end bolt 40 is tightened and the bearing group is forcibly moved into tight contact with shaft shim 28 and with each other, the outer race of the radial load bearing 30 comes into contact with seating surface 44 of bearing housing 12. As a result of the contact of the outer race of the radial load bearing with seating surface 44, which occurs prior to the point at which the position of the bearing group on the shaft is established, rotor 16 is drawn toward high pressure end wall 46 of the working chamber as bolt 40 is tightened.

At such time as the bearing group can no longer be forced toward shaft collar 26 by the continued tightening of end bolt 40 the position of rotor 16 within the working chamber 14 will have been established as will have been the operating clearance 48 between the high pressure end face 50 of the rotor and the high pressure end wall 46 of the working chamber.

It will be appreciated then that the thickness of shaft shim 28, in addition to being determinative of the position of the bearing group on the rotor shaft, is determinative of the size of the operating clearance 48 which exists between high pressure end face 50 of rotor 16 and the high pressure end wall 46 of the rotor housing. As noted above, during normal operation screw rotor 16 is acted upon by an axial thrust, +VE, which forces the rotor in a direction which is away from the high pressure end wall of the working chamber and which is indicated by arrow 52. When rotor 16 becomes subject to reverse axial thrust, that is, in the −VE direction as is indicated by arrow 54, rotor 16 will tend to move so that the high pressure end face 50 of the rotor approaches the high pressure end wall 46 of the compressor working chamber. Such reverse axial thrust is likely to be encountered when the compressor is unloaded, during transient load conditions, or upon compressor shutdown. To counter such reverse axial thrust and to prevent the contact of the high pressure end face 50 of the rotor with the high pressure end wall 46 of the working chamber, a reverse thrust accomodating arrangement which includes a positive stop feature is provided.

The reverse thrust accomodating arrangement includes a spacer element 56, a load imparting spring 58 and a stop shim 60. In the compressor assembly process, stop shim 60, spacer element 56 and load imparting spring 58 are inserted into bearing chamber 22 while end plate 24 of bearing housing 12 is removed. The size of load imparting spring 58, from the standpoint of its height when it is unloaded, is selected such that when the thickness of shim 60 and spacer element 56 are considered, a portion of the load imparting spring extends through the plane 62 of end face 64 of the bearing housing when end plate 24 is removed.

As bearing housing end plate 24 is assembled to bearing housing 12, stop shim 60 is brought into abutment with the outer race of roller bearing 36 by the similar forced movement of spacer element 56 and load imparting spring 58. At the point in the process of assembling the bearing housing end plate to the bearing housing where stop shim 60 and spacer element 56 cannot be forced to move further into the bearing chamber 22 due to the abutment of stop shim 60 with roller bearing 36, load imparting spring 58 is forced to deflect within spring space 66. Spring space 66 is defined by bearing housing 12, bearing housing end plate 24 and an annular recess in spacer element 56. The deflection of load imparting spring 58 within spring space 66 continues until end plate 24 is fully assembled onto the bearing housing. Because of the forced deflection of load imparting spring 58 during the assembly process the rotor housing bearing group is preloaded and the rotor is imparted a predetermined axial thrust in the +VE direction. This preload exists and acts upon the rotor at all times whether or not the compressor is in operation.

Load imparting spring 58 acts on spacer element 56, which transmits the spring force, so as to urge the spacer element, and therefore stop shim 60, the bearing group and the rotor, away from the inner face 68 of the bearing housing end plate. The dimensions of stop shim 60 and spacer element 56 are selected such that after bearing housing end plate 24 is assembled to bearing housing 12 a gap 70 is established between inner face 68 of the bearing housing end plate and bottom face 72 of spacer element 56. The size of gap 70 is in turn determined primarily and most conveniently by the thickness of stop shim 60. It is contemplated that the width of bearings 30, 32, 34 and 36 as well as the width of spacer element 56 will be an easily controllable constant and that the adjustment or obtaining of a predetermined width for gap 70 during the course of compressor assembly will be most easily controlled by the selection of the thickness of stop shim 60.

As earlier mentioned, the forced deflection of load imparting spring 58 during the assembly process preloads the rotor bearing set and biases the rotor in a direction away from the high pressure end wall of the working chamber. The magnitude of the load applied to the bearing set is dependent upon the load rating of load imparting spring 58, which is preferably a Belleville type spring, and the degree to which it is initially compressed. Any preload which is sufficient to overcome the weight of the rotor will position the rotor and maintain operating clearance 48 between rotor end face 50 and working chamber end wall 46 during periods when the rotor is not subject to reverse axial thrust. Load imparting spring is additionally selected, however, so that it also imparts a predetermined additional load to the bearing set which prevents ball skidding in roller bearings 32, 34 and 36 during periods of low thrust conditions.

Load imparting spring 58 is further selected, however, to provide a predetermined magnitude of resistance to the movement of the rotor toward the high pressure end wall of the working chamber when reverse axial thrust conditions do occur. The magnitude of the resistance to such movement, which is a function of the load rating of spring 58, is pre-selected to be insufficient to cause seizing of the roller bearings or to create frictional forces in the bearings which are detrimental to normal compressor operation and bearing life.

Because the strength of load imparting spring 58 is limited for the above mentioned reasons, positive provision must be made to prevent the contact of the high pressure end face of rotor 16 with the high pressure end wall of the working chamber should extraordinarily large reverse axial thrust be imparted to the rotor. In the present invention, such positive provision for preventing rotor to rotor housing contact is provided by the cooperation of load imparting spring 58, spacer element 56 and stop shim 60 with the rotor and the bearing group.

By selecting the thickness of stop shim 60 such that the width of gap 70 is less than operating clearance 48, it will be appreciated that the farthest rotor 16 can move toward high pressure end face 48 of working chamber 14 is equal to the distance represented by gap 70 since, as the rotor moves toward the high pressure end wall of the working chamber so will the bearing set, stop shim 60 and spacer element 56. As soon as bottom face 72 of the spacer element 56 travels the distance equal to the width gap 70 it will abut the inner face 68 of the bearing housing end plate 24. At the time such abutment occurs roller bearing 36 will have taken up the entire reverse axial thrust load and the rotor will be precluded from moving any further toward the high pressure end wall of the working camber. A positive stop is therefore provided which precludes the contact of rotor 16 with the high pressure end wall 46 of the working chamber 14.

Before bottom face 72 of spacer element 56 can be brought into abutment with inner face 68 of bearing housing end plate 24 load imparting spring 58 must collapse further than the degree of collapse represented by the deflection of the spring which occurs and which is occasioned by the compressor assembly process. Therefore, sufficient space is provided within spring space 66 to allow for the continued deflection of load imparting spring 58 until such time as contact is made between inner face 68 of the bearing housing end plate and bottom face 72 of the spacer element. Spring 58 is preferably of an outside diameter such that it is essentially self-centering within bearing chamber 22 and spacer element 56 and stop shim 60 have outside diameters which allow for their limited, but unimpeded, radial and axial movement within bearing chamber 22.

As noted above, when spacer element 56 bottoms out against bearing housing end plate 24, reverse angle contact ball bearing 36 takes up the reverse thrust load. The use of ball bearing 36 to take up the reverse axial thrust load is inherently more reliable, forgiving, simple and inexpensive than screw compressor arrangements wherein the abutment of the high pressure end face of a screw rotor with the high pressure end wall of the working chamber is contemplated in due course. Further, the use of a spring having a predetermined limited thrust reversal countering effect is preferable to an arrangement in which a spring of sufficient strength to counter all forseeable magnitudes of reverse thrust is employed because the use of such strong springs inherently and disadvantageously affects bearing life and imposes high frictional losses on the compressor irrespective of the operating condition of the compressor and the direction of thrust on the rotors.

It will be appreciated that the number, disposition and type of bearings which may be used in the accomplishment of the objects of the present invention may vary from one application to the next. Further, it should be clear that while load imparting spring 58 is preferably a Belleville spring, other mechanical and/or hydraulic schemes are contemplated by which a limited and controlled amount of preload and thrust is delivered to the bearing group. Finally, it will be recognized that both shaft shim 28 and stop shim 60 could be located at other positions on the rotor shaft and in the bearing chamber respectively such as between the bearings. That is, the lineup of the shaft shim and bearings on the shaft or the stop shim, bearings, spacer and spring within the bearing chamber can be varied. Therefore, the scope of the present invention should not be limited to the specifics set forth immediately above but is, rather, in accordance with the language of the claims which follow.

What is claimed is:

1. A method for precluding the contact of the high pressure end face of a screw rotor with the high pressure end wall of the working chamber in a screw compressor due to the development of reverse axial thrust on the rotor comprising the steps of:
   establishing an operating clearance between the high pressure end face of said rotor and the high pressure end wall of the compressor working chamber by fixing the location of the bearings on the shaft which extends from the high pressure end face of the screw rotor;

compressing a spring against a fixed surface in said compressor;

transmitting the force developed by the compression of said spring, through an element having a contact surface, to the rotor bearings so as to preload the bearings and so as to impart a continuous axial load to the rotor which urges the rotor away from the high pressure end wall of the working chamber; and establishing a gap between the contact surface of the force transmitting element and a fixed surface of said compressor which is less than the operating clearance established between the rotor and working chamber end wall so that the contact surface of the transmitting element comes into contact with a fixed compressor surface prior to the contact of the rotor with the working chamber end wall when sufficient axial thrust is developed in the compressor to drive the rotor toward the high pressure end wall of the compressor working chamber.

2. The method according to claim 1 further comprising the step of collapsing the spring into an accomodating space to allow for the contact of the contact surface of the transmitting element with the fixed compressor surface.

3. The method according to claim 2 wherein said step of establishing an operating clearance includes the step of disposing a shim of a predetermined thickness on the shaft of the rotor.

4. The method according to claim 3 wherein said step of establishing a gap includes the step of disposing a shim in said compressor to position the contact surface of the transmitting element at a predetermined distance from the fixed compressor surface it is capable of contacting.

5. A bearing arrangement, including a positive stop, for the prevention of contact between the high pressure end face of a screw rotor and the high pressure end wall of the working chamber of a screw compressor, comprising:

a bearing group fixedly mounted on the shaft extending from the high pressure end face of said rotor;

means, acting on said bearing group and therefore on said rotor, for urging said rotor away from the high pressure end wall of the compressor working chamber, said urging means being means which permit the movement of said rotor toward the high pressure end wall of the compressor when said rotor is subject to a force of a predetermined magnitude which urges said rotor in the direction of the high pressure end wall of said working chamber;

means for establishing, in cooperation with said urging means, an operating clearance between the high pressure end face of the rotor and the high pressure end wall of the compressor working chamber by establishing the position of said bearing group on the rotor shaft; and means for establishing the distance said rotor is permitted to physically move toward the high pressure end wall of the compressor working chamber, said distance being less than the clearance established by said means for establishing an operating clearance so that contact between the rotor high pressure end face and the working chamber high pressure end wall is precluded.

6. The bearing arrangement according to claim 5 wherein said means for urging comprises means for imparting a predetermined load and means for transmitting said predetermined load to said bearing group.

7. The bearing arrangement according to claim 6 wherein said means for imparting a load comprises spring means.

8. The bearing arrangement according to claim 7 wherein said spring means is disposed between said load transmitting means and a fixed surface of said compressor.

9. The bearing arrangement according to claim 8 wherein said spring means is under compression at all times and under all conditions of compressor operation so as to continuously act on said bearing group and so as to continuously impart an axial thrust to the rotor through said bearing group which urges the rotor away from the high pressure end wall of the compressor working chamber.

10. The bearing arrangement according to claim 5 wherein said load transmitting means has a surface which comes into contact with a fixed surface of said compressor when said rotor has moved said distance established by said distance establishing means in a direction toward the high pressure end wall of the compressor working chamber.

11. The bearing arrangement according to claim 10 wherein the degree of compression of said spring means is in direct correlation to the distance said contacting surface is from said fixed surface, the degree of compression of said spring means being a maximum when said contacting surface of said load transmitting means is in contact with said fixed surface of said compressor.

12. The bearing arrangement according to claim 10 wherein said means for establishing an operating clearance is a first shim disposed on said rotor shaft and wherein said means for establishing the distance said rotor can move is a second shim disposed amongst said load transmitting means, said bearing group and said spring means.

13. A screw compressor comprising:

a housing defining a working chamber having a high pressure end wall;

a screw rotor disposed in said working chamber and having a high pressure end face from which a shaft extends;

bearing means, disposed on said rotor shaft, for mounting said rotor in said compressor and for taking up axial and radial loads imposed on said rotor;

means for continuously imparting an axial load of a predetermined magnitude to said rotor and to said bearing means so that said bearing means and said rotor are at all times subject to axial thrust which urges said rotor in a direction which is away from said high pressure end wall of said compressor working chamber, said load imparting means being means which yield to allow said rotor to move toward said high pressure end wall of said working chamber when said rotor is subject to axial thrust of a magnitude greater than said predetermined magnitude that is in a direction which urges said rotor toward said high pressure end wall; and means for overcoming said continuous load imparting means and for providing a positive stop which physically limits the movement of said rotor toward said high pressure end wall of said working chamber when said rotor is subjected to axial thrust of a magnitude greater than and in a direction opposite of the thrust imparted by said continuous load imparting means, said means for overcoming precluding the contact of said rotor with said working chamber end wall.

14. The screw compressor according to claim 13 wherein said means for continuously imparting an axial load comprises spring means seated against a fixed surface of said compressor and wherein said means for overcoming said continuous load imparting means includes means having a surface which comes into contact with a fixed surface of said compressor when said continuous load imparting means is overcome.

15. The screw compressor according to claim 14 wherein said means for overcoming includes means for establishing an operating clearance between the high pressure end face of said screw rotor and the high pressure end wall of the compressor working chamber and means for establishing the distance said rotor can move toward said working chamber high pressure end wall, said distance being less than said operating clearance.

16. The screw compressor according to claim 15 wherein said means for establishing an operating clearance comprises a shim disposed on said rotor shaft, and wherein said means for establishing the distance said rotor can move is a second shim.

17. The screw compressor according to claim 15 wherein said means having a surface which comes into contact with a fixed surface of said compressor comprises a spacer element upon which said spring means acts, said spacer element defining a space into which said spring means collapses when said rotor is subject to an axial load in a direction which is opposite and of a magnitude greater than the axial load imparted by said spring means.

18. An arrangement in a screw compressor comprising:
- a housing defining a working chamber having a high pressure end wall;
- a screw rotor disposed in said working chamber and having a high pressure end face from which a shaft extends;
- bearing means, disposed on said rotor shaft and including a bearing for taking up axial thrust on said rotor which is in a direction that urges said rotor toward the high pressure end wall of said working chamber, for rotatably mounting said rotor in said working chamber;
- a first shim, disposed on said rotor shaft for establishing an operating clearance between the high pressure end face of said rotor and the high pressure end wall of said working chamber by establishing the position of said bearing means on said rotor shaft;
- spring means, under some degree of compression at all times, for continuously loading said bearing means and for urging said rotor away from said high pressure end wall of said working chamber;
- spacer means, acted upon by said spring means, for transmitting the load imparted by said spring means to said bearing means and therethrough to said rotor, said spacer element defining a surface which comes into contact with a fixed surface of said compressor when said rotor is subject to axial thrust in a direction which is opposite the direction in which said rotor is urged by said spring means and which is greater in magnitude than the load imparted by said spring means; and
- a second shim for establishing a gap between a fixed surface of said compressor and said contact surface of said spacer element, the width of said gap being less than said operating clearance established by said first shim, whereby contact of the high pressure end face of said screw rotor with the high pressure end wall of the working chamber of said compressor is positively precluded by the contact of said spacer means with said fixed compressor surface prior to the contact of said rotor with said high pressure end wall of said working chamber when said rotor moves toward said high pressure end wall.

19. The arrangement according to claim 18 wherein said spacer element defines a space into which said spring means can collapse.

* * * * *

UNITED STATES PATENT AND TRADEMARK OFFICE
CERTIFICATE OF CORRECTION

PATENT NO. : 4,730,995

DATED : March 15, 1988

INVENTOR(S) : Randy E. Dewhirst

It is certified that error appears in the above-identified patent and that said Letters Patent is hereby corrected as shown below:

Column 10, Claim 10, line 22, "5" should read -- 9 --.

Signed and Sealed this

Sixteenth Day of August, 1988

Attest:

DONALD J. QUIGG

*Attesting Officer*  *Commissioner of Patents and Trademarks*